(12) United States Patent
Root et al.

(10) Patent No.: US 12,548,217 B2
(45) Date of Patent: Feb. 10, 2026

(54) SYSTEMS AND METHODS FOR GENERATING A VISUALIZATION OF WORKSPACE EMPLOYEES

(71) Applicant: Sensormatic Electronics, LLC, Boca Raton, FL (US)

(72) Inventors: Cory Olog Root, Delray Beach, FL (US); Matthew Wilson, Bunnell, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 184 days.

(21) Appl. No.: 18/479,534

(22) Filed: Oct. 2, 2023

(65) Prior Publication Data

US 2024/0112385 A1    Apr. 4, 2024

Related U.S. Application Data

(60) Provisional application No. 63/413,149, filed on Oct. 4, 2022.

(51) Int. Cl.
*G06T 11/60*  (2006.01)
*G06T 3/40*  (2024.01)
(Continued)

(52) U.S. Cl.
CPC ............... *G06T 11/60* (2013.01); *G06T 3/40* (2013.01); *G06T 7/337* (2017.01); *G06V 40/10* (2022.01);
(Continued)

(58) Field of Classification Search
CPC . G06T 11/60; G06T 3/40; G06T 7/337; G06T 2210/16; G06T 2210/22; G06V 40/10
See application file for complete search history.

(56) References Cited

U.S. PATENT DOCUMENTS 9,141,856 B2 * 9/2015 Maeda .................... G06V 20/80
12,165,196 B2 * 12/2024 Lee .......................... G06T 11/60
(Continued)

FOREIGN PATENT DOCUMENTS

CN    113 989 858 A    1/2022
CN    114 743 154 A    7/2022

OTHER PUBLICATIONS

Irhebhude, Martins E., and Eran A. Edirisinghe. "Personnel Recognition in the Military using Multiple Features." Â International Journal of Computer Vision and Signal ProcessingÂ 5.1 (2015): 23-30. (Year: 2015).*

(Continued)

*Primary Examiner* — Said Broome
*Assistant Examiner* — Jordan Wan Yick
(74) *Attorney, Agent, or Firm* — ArentFox Schiff LLP

(57) ABSTRACT

Example implementations include a method, apparatus and computer-readable medium for generating a visual model of a uniform, comprising detecting a plurality of persons in one or more images. The implementations further include generating a sub-image depicting the respective person from the one or more images for each respective person of the plurality of persons. Additionally, the implementations further include identifying one or more articles of clothing worn by the respective person, executing at least one transformation that adjusts pixels of the sub-image such that the one or more articles of clothing depicted in the sub-image fit in a common template, calculating variance values between a plurality of transformed sub-images comprising the sub-image transformed by the at least one transformation and other sub-images generated for other persons in the plurality of persons and transformed by the at least one transformation, and generating a virtual model based on the variance values.

18 Claims, 13 Drawing Sheets

(51) Int. Cl.
*G06T 7/33* (2017.01)
*G06V 40/10* (2022.01)
(52) U.S. Cl.
CPC ...... *G06T 2210/16* (2013.01); *G06T 2210/22* (2013.01)

(56) References Cited

U.S. PATENT DOCUMENTS

2013/0044944 A1 2/2013 Wang et al.
2023/0237768 A1* 7/2023 Vijay .................. G06V 10/454

OTHER PUBLICATIONS

A. Jain, D. Modi, R. Jikadra and S. Chachra, "Text to Image Generation of Fashion Clothing," Â 2019 6th International Conference on Computing for Sustainable Global Development (IndiaCom), New Delhi, India, 2019, pp. 355-358. (Year: 2019).*
International Search Report issued in corresponding International Application No. PCT/US2023/075854 dated Feb. 22, 2024.

* cited by examiner

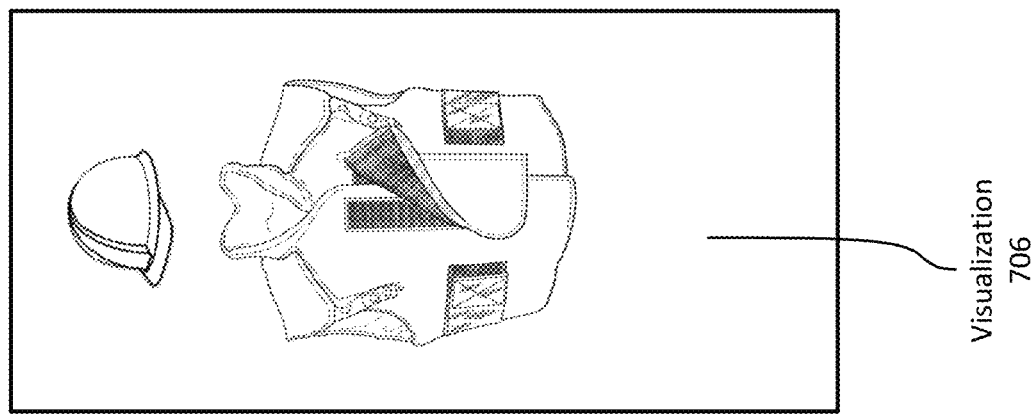
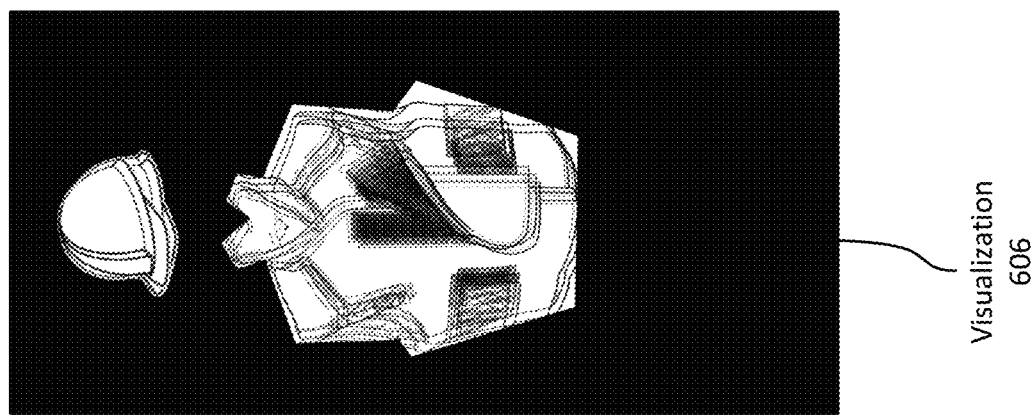
Fig. 7

1000

```
┌─────────────────────────────────────────────────────────────┐
│ Omitting from the virtual model clothing in a region of a given │
│ sub-image with a respective variance value greater than a      │─ 1102
│ threshold variance value                                        │
└─────────────────────────────────────────────────────────────┘
                              │
                              ▼
┌─────────────────────────────────────────────────────────────┐
│ Including in the virtual model the clothing in the region of the │
│ given sub-image with the respective variance value not greater │─ 1104
│ than the threshold variance value                               │
└─────────────────────────────────────────────────────────────┘
```

```
┌─────────────────────────────────────────────────────────────┐
│                          1010                                │
│  ┌─────────────────────────────────────────────────────┐    │
│  │ Overlaying the sub-image with each of the other     │─ 1202│
│  │ sub-images                                           │    │
│  └─────────────────────────────────────────────────────┘    │
│                                                              │
│  ┌─────────────────────────────────────────────────────┐    │
│  │ Calculating a difference for each overlaid pixel    │    │
│  │ value between the sub-image and each of the         │─ 1204│
│  │ other sub-images                                     │    │
│  └─────────────────────────────────────────────────────┘    │
│                                                              │
│  ┌─────────────────────────────────────────────────────┐    │
│  │ Determining an average difference in for each       │    │
│  │ overlaid pixel value based on the difference        │    │
│  │ between the sub-image and each of the other sub-    │─ 1206│
│  │ images, wherein the variance values are a plurality │    │
│  │ of average differences                               │    │
│  └─────────────────────────────────────────────────────┘    │
└─────────────────────────────────────────────────────────────┘
```

Fig. 12

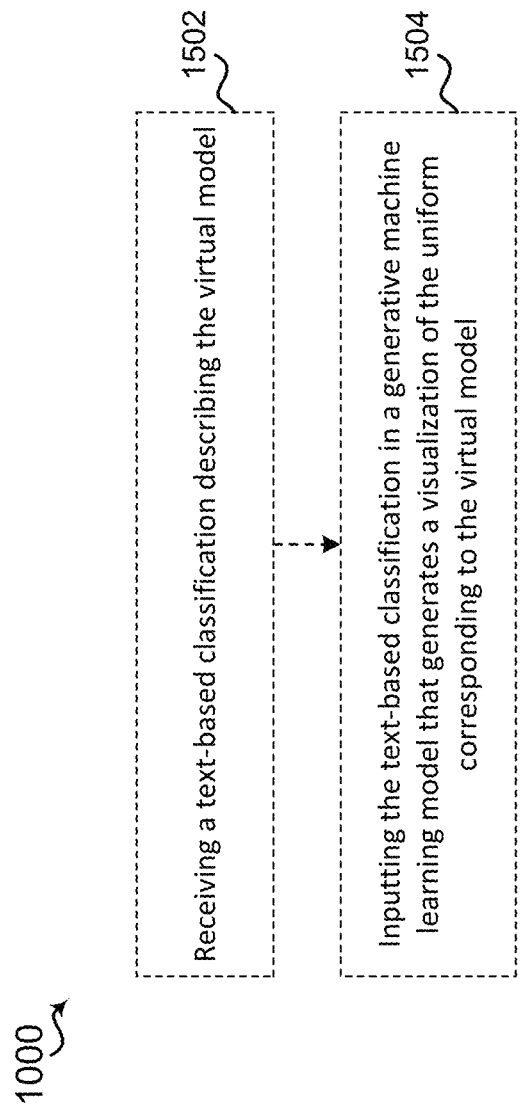

SYSTEMS AND METHODS FOR GENERATING A VISUALIZATION OF WORKSPACE EMPLOYEES

CLAIM OF PRIORITY

The present Application for Patent claims priority to U.S. Provisional Application No. 63/413,149 entitled filed on Oct. 4, 2022, and assigned to the assignee hereof and hereby expressly incorporated by reference.

BACKGROUND

Technical Field

The described aspects relate to computer vision systems.

Introduction

Generally, workspace owners such as retailers are interested in understanding statistics around various factors such as average footfall, customer dwell time, level of engagement of employees with customers, employee performance, etc. These factors are crucial to track workspace performance. Similarly, such factors are important in other workspaces such as airports, corporate spaces, hospitals, etc. For example, in a hospital environment, it is important to track level of engagement of doctors with patients in order to prepare in advance for emergency situations.

Typically, cameras installed at workspaces are used for monitoring the workspace to track workspace performance. For example, data frames provided by cameras are analyzed to detect employees and customers and further track various factors such as employee engagement with customers, employee performance, average footfall of customers, etc.

Conventional systems use various techniques to analyze the data frames, for example to distinguish between employees and non-employees of the workspace. However, such conventional techniques are computation expensive and often violate privacy of persons as they capture Personally Identifiable Information (PII) of persons. Accordingly, there exists a need for improvements in conventional systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for generating a visual model of a uniform, comprising detecting a plurality of persons in one or more images. The method further includes generating a sub-image depicting the respective person from the one or more images for each respective person of the plurality of persons. Additionally, the method further includes identifying one or more articles of clothing worn by the respective person. Additionally, the method further includes executing at least one transformation that adjusts pixels of the sub-image such that the one or more articles of clothing depicted in the sub-image fit in a common template. Additionally, the method further includes calculating variance values between a plurality of transformed sub-images comprising the sub-image transformed by the at least one transformation and other sub-images generated for other persons in the plurality of persons and transformed by the at least one transformation. Additionally, the method further includes generating a virtual model depicting matching articles of clothing worn by the plurality of persons based on the variance values.

Another example aspect includes an apparatus for generating a visual model of a uniform, comprising one or more memories and one or more processors coupled with the one or more memories, wherein the one or more processors are configured, individually or in combination, to perform the following actions. The one or more processors are configured to detect a plurality of persons in one or more images. The one or more processors are further configured to generate a sub-image depicting the respective person from the one or more images for each respective person of the plurality of persons. Additionally, the one or more processors are further configured to identify one or more articles of clothing worn by the respective person. Additionally, the one or more processors are further configured to execute at least one transformation that adjusts pixels of the sub-image such that the one or more articles of clothing depicted in the sub-image fit in a common template. Additionally, the one or more processors are further configured to calculate variance values between a plurality of transformed sub-images comprising the sub-image transformed by the at least one transformation and other sub-images generated for other persons in the plurality of persons and transformed by the at least one transformation. Additionally, the one or more processors are further configured to generate a virtual model depicting matching articles of clothing worn by the plurality of persons based on the variance values.

Another example aspect includes an apparatus for generating a visual model of a uniform, comprising means for detecting a plurality of persons in one or more images. The apparatus further includes means for generating a sub-image depicting the respective person from the one or more images for each respective person of the plurality of persons. Additionally, the apparatus further includes means for identifying one or more articles of clothing worn by the respective person. Additionally, the apparatus further includes means for executing at least one transformation that adjusts pixels of the sub-image such that the one or more articles of clothing depicted in the sub-image fit in a common template. Additionally, the apparatus further includes means for calculating variance values between a plurality of transformed sub-images comprising the sub-image transformed by the at least one transformation and other sub-images generated for other persons in the plurality of persons and transformed by the at least one transformation. Additionally, the apparatus further includes means for generating a virtual model depicting matching articles of clothing worn by the plurality of persons based on the variance values.

Another example aspect includes a computer-readable medium having instructions stored thereon for generating a visual model of a uniform, wherein the instructions are executable by one or more processors, individually or in combination, to detect a plurality of persons in one or more images. The instructions are further executable to generate a sub-image depicting the respective person from the one or more images for each respective person of the plurality of persons. Additionally, the instructions are further executable to identify one or more articles of clothing worn by the respective person. Additionally, the instructions are further executable to execute at least one transformation that adjusts pixels of the sub-image such that the one or more articles of clothing depicted in the sub-image fit in a common template. Additionally, the instructions are further executable to calculate variance values between a plurality of transformed sub-images comprising the sub-image transformed by the at least one transformation and other sub-images generated for other persons in the plurality of persons and transformed by the at least one transformation. Additionally, the instructions are further executable to generate a virtual model depicting matching articles of clothing worn by the plurality of persons based on the variance values.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which:

FIG. 7 is a diagram for generating a refined virtual model of a uniform, in accordance with exemplary aspects of the present disclosure.

FIG. 11 is a flowchart of additional aspects of the method of FIG. 10;

FIG. 12 is a flowchart of additional aspects of the method of FIG. 10;

FIG. 15 is a flowchart of additional aspects of the method of FIG. 10.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure describes systems and methods for generating a virtual model of a workspace employee uniform. The virtual model provides the advantage of allowing the system to detect employees without capturing personally identifiable information (PII). For example, conventional classification systems that attempt to differentiate between an employee and a customer often fail to make a distinction because the uniform of the employee is not pre-programmed or adequately learned. This forces such classification systems to rely on facial images to learn which faces are recurring and identify those faces as belonging to employees. This is not an efficient approach because it requires a large storage overhead to store facial features, is ineffective when the images do not clearly show faces, and cannot be taken when storing PII is forbidden. To address these shortcomings, the present disclosure describes how to generate a robust virtual model that accounts for the different uniform variations in a given workspace and how to execute the virtual model to classify employees. It should be noted that the features of the present disclosure are applicable to any setting that uses uniforms (e.g., schools, parades, etc.).

Figure 1:
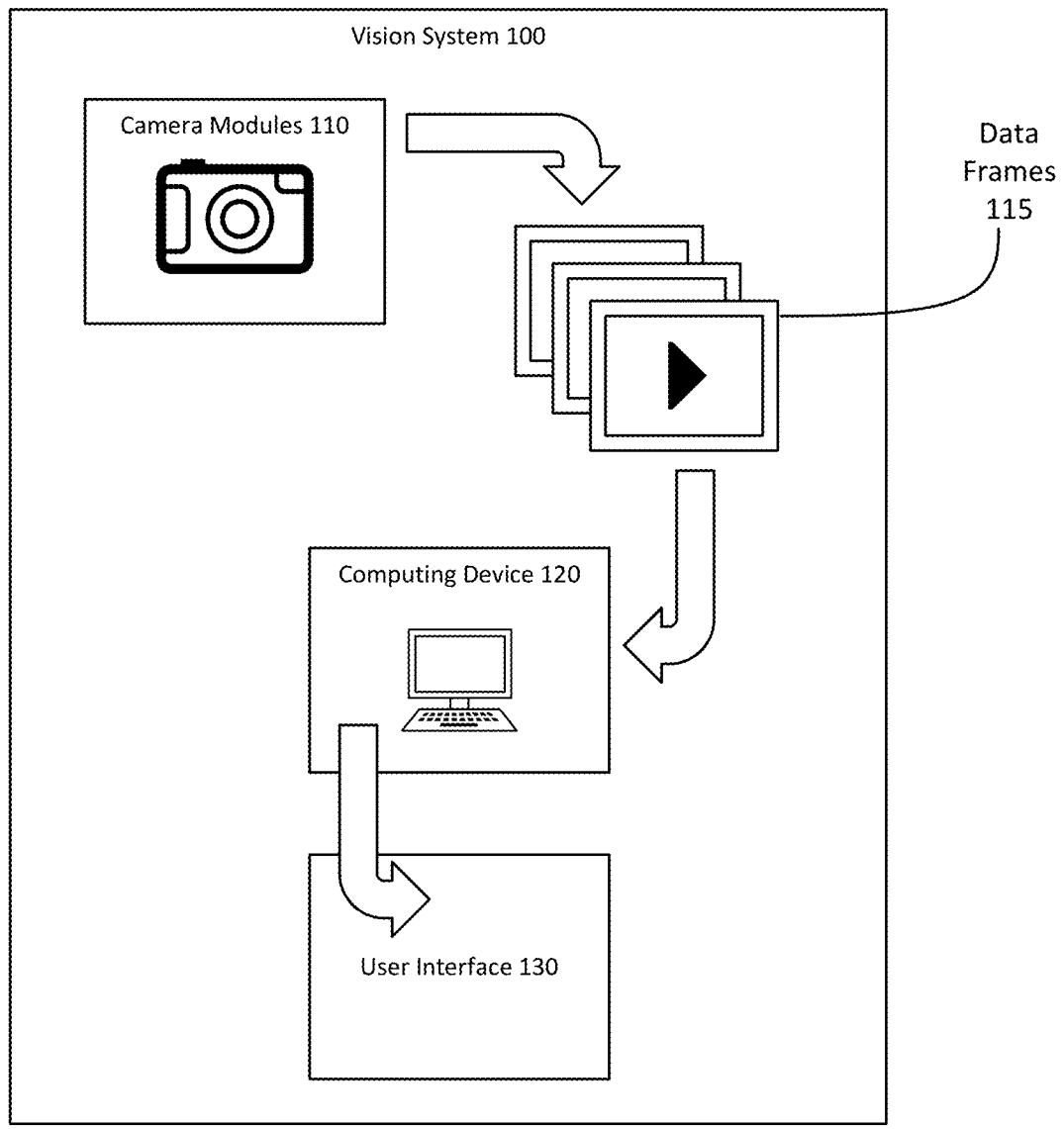
FIG. 1 is a block diagram of a vision system, in accordance with exemplary aspects of the present disclosure.

Referring now to FIG. 1, a block diagram of a vision system 100, is shown in accordance with exemplary aspects of the present disclosure. The vision system 100 may comprise one or more camera modules 110. In one example, the camera modules 110 may include any combination of image sensors, video cameras, still image cameras, CCTV cameras, and image and video processing systems for monitoring an environment (such as a retail environment). The camera modules 110 may provide video streams pertaining to the environment. The video stream includes a plurality of data frames 115 such as video frames and/or image frames. For example, the camera modules 110 may capture 30 data frames 115 per second. Then, for each second, the video stream includes the 30 captured data frames 115. In some aspects, the camera modules 110 may provide timestamped data frames 115 that may be stored in a database (not shown) of the vision system 100.

Further, the vision system 100 may comprise a computing device 120 that generates a user interface 130. In an aspect, the user interface 130 may be implemented using an electronic device associated with a user that may be selected from, but not limited to, wearable devices (e.g., optical head mounted display, smartwatch, etc.), smart phones and/or mobile devices, desktop, computer, laptop and netbook computing devices, tablet computing devices, digital media devices, personal digital assistant (PDA) and any other device having communication capabilities and/or processing capabilities. In some aspects, the user interface 130 may be associated with a user such as an admin of the retail environment.

In some aspects, the user interface 130 may graphically present information pertaining to the data frames 115 received from camera modules 110 (e.g., boundary boxes, queue space identifiers, etc.). The user interface 130 may also be presented on a secondary computing device (not shown). For example, computing device 120 may be a server that performs computations based on the received data frames 115, and the secondary computing device may be a smartphone or a laptop that presents the results of the computations via the user interface 130. The communication between the computing device 120 and the secondary computing device may be performed via a communication network (e.g., Internet, 4G/5G network, enterprise network, or any other standard network).

In some aspects, the computing device 120 may be implemented as a module of the camera modules 110 or on another device (e.g., server) communicatively coupled to the camera modules 110 for receiving the video streams from the camera modules 110.

Figure 2:
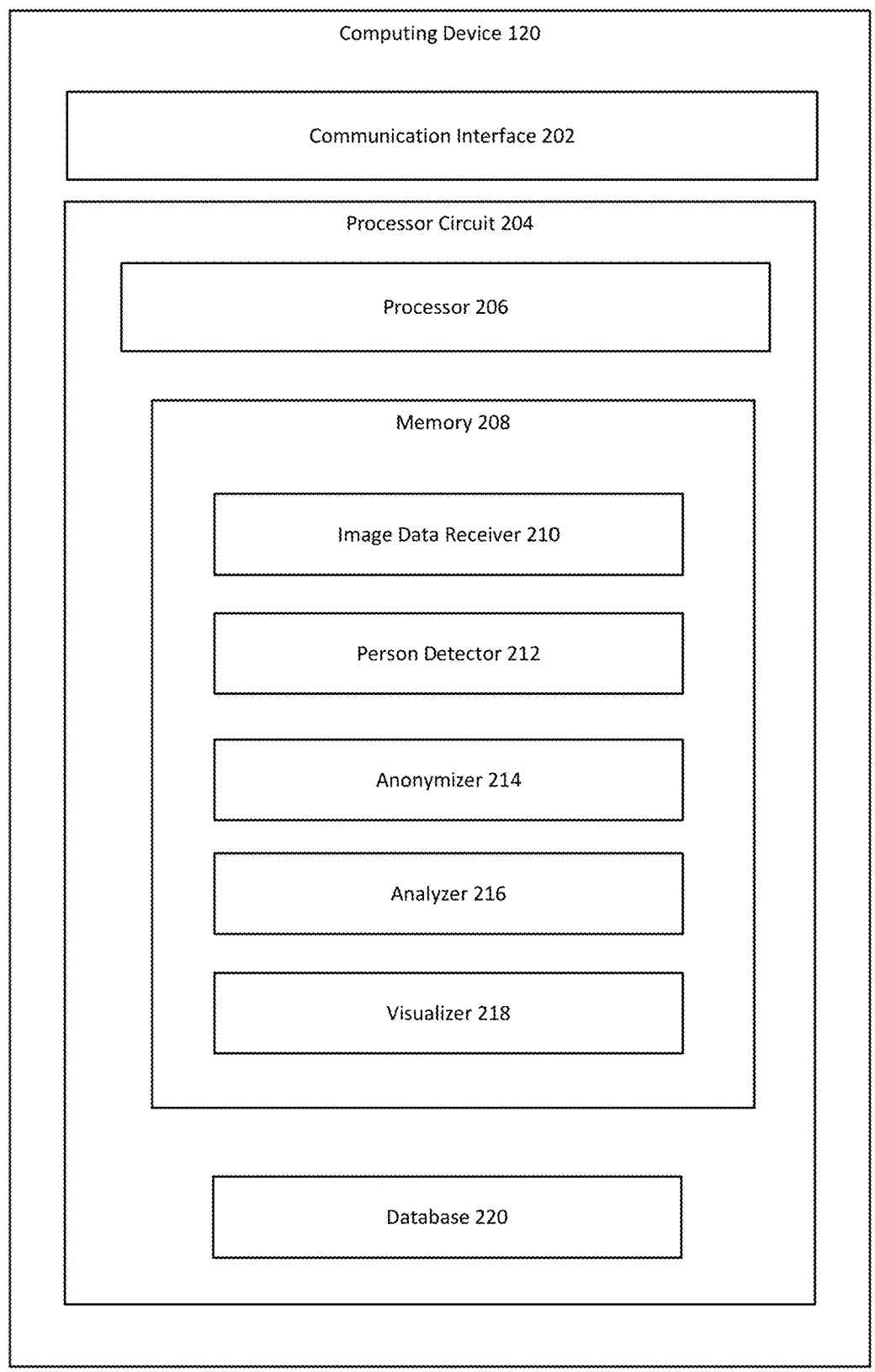
FIG. 2 is block diagram of a computing device of FIG. 1, in accordance with exemplary aspects of the present disclosure.

FIG. 2 is a block diagram of the computing device 120. In some aspects, the computing device 120 may be one or more controllers, servers, and/or computers located in a security panel or part of a central computing system of the environment (such as a retail environment, hospitals, schools, airports, corporate spaces etc.). The computing device 120 is shown to include a communication interface 202 and a processing circuit 204. Communication interface 202 may include wired or wireless interfaces (e.g., jacks, antennas, transmitters, receivers, transceivers, wire terminals, etc.) for conducting data communications with various systems, devices, or networks. For example, communication interface 202 may include an Ethernet card and port for sending and receiving data via an Ethernet-based communications network and/or a Wi-Fi transceiver for communicating via a wireless communications network. Communication interface 202 may be configured to communicate via local area networks or wide area networks (e.g., the Internet, a building WAN, etc.) and may use a variety of communication protocols (e.g., BACnet, IP, LON, etc.).

Communication interface 202 may be a network interface configured to facilitate electronic data communications between the computing device 120 and various external systems or devices (e.g., camera modules 110, user interface 130 etc.).

The processing circuit 204 is shown to include a processor 206 and a memory 208. The processor 206 may be a general purpose or specific purpose processor, an application specific integrated circuit (ASIC), one or more field programmable gate arrays (FPGAs), a group of processing components, or other suitable processing components. The processor 206 may be configured to execute computer code or instructions stored in memory 208 or received from other computer readable media (e.g., CDROM, network storage, a remote server, etc.).

The memory 208 may include one or more devices (e.g., memory units, memory devices, storage devices, etc.) for storing data and/or computer code for completing and/or facilitating the various processes described in the present disclosure. The memory 208 may include random access memory (RAM), read-only memory (ROM), hard drive storage, temporary storage, non-volatile memory, flash memory, optical memory, or any other suitable memory for storing software objects and/or computer instructions. The memory 208 may include database components, object code components, script components, or any other type of information structure for supporting various activities and information structures described in the present disclosure. The memory 208 may be communicably connected to the processor 206 via the processing circuit 204 and may include computer code for executing (e.g., by processor 206) one or more processes described herein.

Still referring to FIG. 2, the computing device 120 is shown to include an image data receiver 210. The image data receiver 210 may be configured to receive video streams (including data frames) pertaining to the environment from one or more camera modules 110. The data frames may comprise a plurality of images and/or videos pertaining to the environment. In some aspects, the image data receiver 210 may receive timestamped data frames from the camera modules 110. In other aspects, the image data receiver 210 may receive the data frames and timestamp the data frames, that are further stored in the database 220. Although FIG. 2 depicts database 220 as part of the computing device 120, it is to be understood that the database 220 may be a separate component that may be a remote database or cloud storage.

Still referring to FIG. 2, the computing device 120 is shown to include a person detector 212. The person detector 212, in some exemplary aspects, employs Artificial Intelligence (AI) and/or Machine Learning (ML) based techniques to detect persons in the data frames. In some exemplary aspects, the person detector 212 may utilize one or more image processing techniques to detect persons in the data frames. The person detector 212 may be configured to determine a Region of Interest (ROI) within the data frame to determine and locate a person within the region of interest. The region of interest may be the entire data frame being captured by the camera modules 110 or a portion of the data frame, as set by the user. In some aspects, the person may be detected using an object detection software as known in the art.

In some aspects, the person detector 212 may generate a bounding box (not shown in figures) around the person(s) detected within the data frame. For clarity, the bounding boxes around the person(s) indicates people identified within a data frame. In other words, the bounding box also represents location of person within the data frame. Additionally, the person detector 212 may tag each of the bounding boxes with a unique identifier, where each bounding box corresponds to a single person identified within the data frame. In other words, the unique identifier is also associated with the persons within the bounding box. The count of bounding boxes generated and/or count of unique identifier generated corresponds to the number of persons identified in a particular data frame. In the present disclosure, the persons may be identified or referred to by unique identifiers. The persons may be identified based on the unique identifier tagged with the respective bounding boxes.

In an exemplary aspect, the vision system 100 is capable of establishing a correlation between bounding boxes generated for the same person identified by multiple cameras within their respective data frames. Thereby, allowing the vision system 100 to keep track of the persons from different angles or views. For an example, one person may be visible within the data frames generated by different cameras of the camera modules 110. Said person may be associated with a single unique identifier. In another aspect, different unique identifiers may be allotted to the bounding boxes generated by the person detector 212 of different cameras of the camera modules 110.

Still referring to FIG. 2, the computing device 120 is shown to include an anonymizer 214. The anonymizer 214 may be configured to obtain the bounding boxes generated by the person detector 212. Further, the anonymizer 214 may be configured to segregate the bounding boxes into a plurality of portions such as face, torso, arms, legs, head etc., by employing at least one of artificial intelligence, machine learning, and image processing techniques. Further, the anonymizer 214 may analyze the plurality of portions to perform a masking operation on the bounding boxes. In some aspects, the anonymizer 214 may perform the masking operation on one or more portions representing person face to conceal Personally Identifiable Information (PII) of the persons. For example, the anonymizer 214 may perform face blurring of the persons detected in the bounding box. In some aspects, the anonymizer 214 may employ one or more techniques such as Image Processing, Artificial Intelligence (AI), Machine Learning (ML), Computer Vision, etc. to obfuscate facial information of the persons detected within the data frames in order to maintain anonymity of the persons. By performing anonymization, unlike conventional systems, the vision system 100 of the present invention does not captures PII of persons, thereby maintaining privacy of the persons. Upon performing the masking operation, one or more portions are masked, and one or more portions are unmasked in each of the bounding boxes.

Still referring to FIG. 2, the computing device 120 is shown to include an analyzer 216.

The analyzer 216 may be configured to communicate with the anonymizer 214 to obtain the unmasked portions (such as torso, head, hats, arms, legs, etc.). Further, the analyzer 216 may aggregate the unmasked portions of each of the bounding boxes. The analyzer 216 may further analyze the aggregated unmasked portions to determine a variance score for the aggregated unmasked portions. In one aspect, areas of the aggregated unmasked portions having a low variance score may indicate uniformity or similarity. The analyzer 216 may identify such areas having a low variance score to detect identical features. Additionally, in some aspects, the analyzer 216 may identify areas of the aggregated unmasked portions having a high variance score and further eliminate such areas. Thus, only the areas with a low variance score may be obtained.

Further, the analyzer 216 may analyze such areas of the aggregated unmasked portions with the low variance score to generate one or more insights. For example, the areas may show one or more identical features, such as identical shirts, hats, pants, ties etc. The analyzer 216 may detect such identical features. The identical features may indicate presence of a predetermined type of person. In some aspects, the predetermined type of person may be an employee of the environment. In some aspects, the identical features may comprise one or more of an outline of an employee uniform (for example, shirt, hat, pant, tie, coat, etc.) a color representation of the employee uniform, a logo on the employee uniform (e.g., a logo associated with the environment), presence of a nametag, etc. In some aspects, the outline of the employee uniform may be identified by employing edge detection techniques. In some aspects, the identical features may be analyzed with the help of predetermined images of employee uniforms stored in the database 220.

Still referring to FIG. 2, the computing device 120 is shown to include a visualizer 218. The visualizer 218 may communicate with the analyzer 216 to obtain information on the identical features. Further, the visualizer 218 may generate a virtual model based on the identical features, where the identical features may indicate presence of the predetermined type of person i.e., employee of the environment and the virtual model may represent uniforms of the employees of the environment. In some aspects, the visualizer 218 may provide the virtual model for display over the user interface 130. The virtual model may be accessed by a user (such as an admin of the environment) via the user interface 130 and may allow the user to gain insights such as level of engagement of employees with customers, employee performance, etc. Additionally, the virtual model may be utilized to distinguish between employees and non-employees of the environment while determining average footfall pertaining to the environment.

Figure 3:
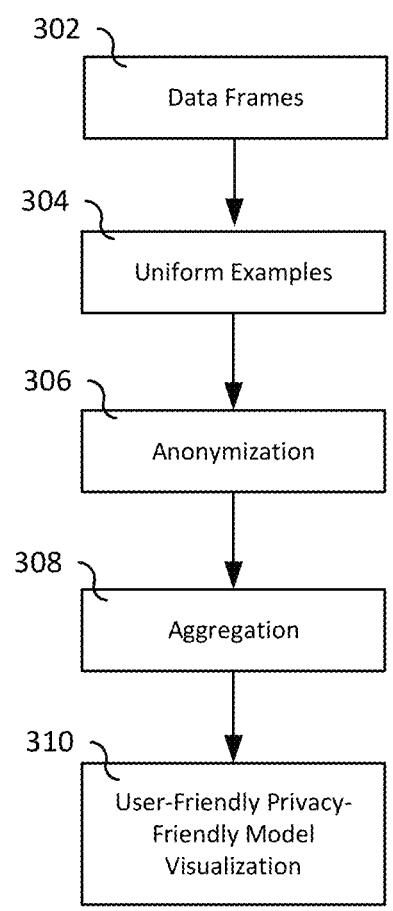
FIG. 3 is a flowchart illustrating a visualization of employee uniforms, in accordance with exemplary aspects of the present disclosure.

Now referring to FIG. 3, a flowchart 300 illustrating visualization of employee uniforms, is shown in accordance with exemplary aspects of the present disclosure.

The flowchart 300 illustrates a process of generating a visualization of employee uniforms. The process includes a step of reception of data frames from the camera modules 110. Further, the data frames are analyzed to detect persons in the data frames and bounding boxes may be generated around the persons detected in the data frames. The bounding boxes may be analyzed with the help of uniform examples alternatively referred as predetermined images of employee uniforms stored in the database 220. The bounding boxes may be segmented into a plurality of portions. A masking operation may be performed on the bounding boxes to maintain anonymity of the persons by masking one or more portions representing person face. Upon performing the masking operation, one or more portions are masked, and one or more portions are unmasked.

Further, the unmasked portions may be aggregated and analyzed by determining variance score. Further, areas of the aggregated unmasked portions having a low variance score may be identified. Such areas having the low variance score may indicate identical features. Further, a virtual model may be generated based on the identical features, where the identical features may indicate presence of the predetermined type of person i.e., employee of the environment and the virtual model may represent uniforms of the employees of the environment. The virtual model being user friendly and privacy friendly and may be provided for display over the user interface 130.

Figure 4:
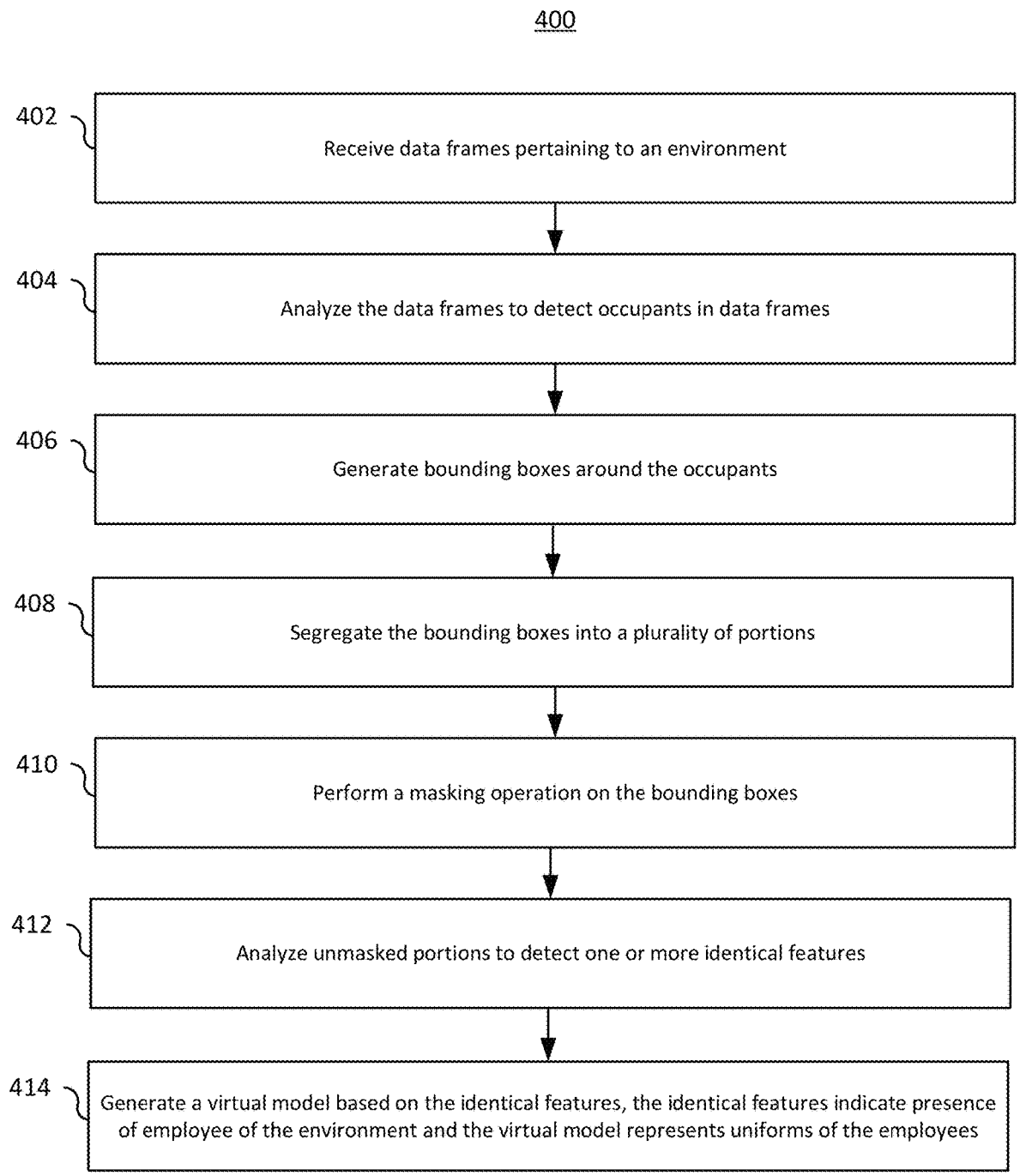
FIG. 4 is a method for generating a virtual model of employee uniforms, in accordance with exemplary aspects of the present disclosure.

Now referring to FIG. 4, a method 400 for generating a virtual model of employee uniforms, is shown in accordance with exemplary aspects of the present disclosure. In some aspects, the method 400 is performed by the vision system 100.

The method 400 is shown to include receiving video streams comprising data frames pertaining to an environment (Step 402). In some aspects, the data frames may be received by the image data receiver 210 (referred above in FIG. 2) from one or more camera modules 110. The data frames may comprise a plurality of images and/or videos pertaining to the environment. In some aspects, timestamped data frames may be received from the camera modules 110. In other aspects, the data frames may be received and timestamped by the image data receiver 210 and further stored in the database 220 (referred above in FIG. 2).

Further, the method 400 is shown to include detecting persons within the received data frames (Step 404). In some aspects, Artificial Intelligence (AI) and/or Machin Learning (ML) based techniques may be employed to detect persons within the received data frames. In some exemplary aspects, one or more image processing techniques may be employed to detect persons within the data frames. A Region of Interest (ROI) within the data frame may be determined to detect and locate a person within the region of interest. The region of interest may be the entire data frame being captured by the camera modules 110 or a portion of the data frame, as set by the user. In some aspects, the persons may be detected by the person detector 212. In some aspects, the persons may be detected using an object detection software as known in the art.

Further, the method 400 is shown to include generating a bounding box (not shown in figures) around the person(s) detected within the data frame (Step 406). For clarity, the bounding boxes around the person(s) indicates people identified within a data frame. In other words, the bounding box also represents location of person within the data frame. Additionally, each of the bounding boxes may be tagged with a unique identifier, where each bounding box corresponds to a single person identified within the data frame. In other words, the unique identifier is also associated with the persons within the bounding box. The count of bounding boxes generated and/or count of unique identifier generated corresponds to the number of persons identified in a particular data frame. In ambit of the present disclosure, the persons may be identified or referred by unique identifiers. The persons may be identified based on the unique identifier tagged with the respective bounding boxes.

In an exemplary aspect, a correlation between bounding boxes generated for the same person identified by multiple cameras within their respective data frames may be established. Thereby, allowing to keep track of the persons from different angles or views. For an example, one person may be visible within the data frames generated by different cameras of the camera modules 110. Such persons may also be associated with a single unique identifier. In another aspect, different unique identifier may be allotted to the bounding boxes generated by the person detector 212 of different cameras of the camera modules 110.

The method 400 is further shown to include segregating each bounding box into a plurality of portions (Step 408). The bounding boxes may be segregated into a plurality of portions such as face, torso, arms, legs, head etc., by employing at least one of artificial intelligence, machine learning, and image processing techniques.

The method 400 is further shown to include performing a masking operation on the bounding boxes (Step 410). The plurality of portions may be analyzed by the anonymizer 214 (referred above in FIG. 2) to perform a masking operation on the bounding boxes. In some aspects, the masking operation may be performed on one or more portions representing person face to conceal Personally Identifiable Information (PII) of the persons. For example, face blurring of the persons detected in the bounding box may be performed. In some aspects, one or more techniques such as Image Processing, Artificial Intelligence (AI), Machine Learning (ML), Computer Vision, etc. may be employed to obfuscate facial information of the persons detected within the data frames in order to maintain anonymity of the persons. By performing anonymization, unlike conventional methods, the method 400 does not involves capturing PII of persons, thereby maintaining privacy of the persons. Upon performing the masking operation, one or more portions are masked, and one or more portions are unmasked in each of the bounding boxes.

The method 400 is further shown to include analyzing the unmasked portions to detect one or more identical features (Step 412). In some aspects, the unmasked portions (such as torso, head, hats, arms, legs, etc.) of each of the bounding boxes may be aggregated. The aggregated unmasked portions may be analyzed to determine a variance score for the aggregated unmasked portions. In one aspect, areas of the aggregated unmasked portions having a low variance score may indicate uniformity or similarity. Such areas having a low variance score may be identified to detect identical features. Additionally, in some aspects, areas having a high variance score may be determined and further eliminated. Thus, only the areas with a low variance score may be obtained. Such areas of the aggregated unmasked portions with the low variance score may be analyzed to generate one or more insights. For example, the areas may show one or more identical features, such as identical shirts, hats, pants, ties. Such identical features may be identified. The identical features may indicate presence of a predetermined type of person. In some aspects, the predetermined type of person may be an employee of the environment. In some aspects, the identical features may comprise one or more of an outline of an employee uniform (for example, shirt, hat, pant, tie, coat etc.) a color representation of the employee uniform, a logo on the employee uniform (for example logo associated with the environment), presence of a nametag etc. In some aspects, the outline of the employee uniform may be identified by employing edge detection techniques. In some aspects, the identical features may be analyzed with the help of predetermined images of employee uniforms stored in the database 220.

The method 400 is further shown to include generating a virtual model based on the identical features (Step 414). In some aspects, the virtual model may be generated by the visualizer 218 (referred above in FIG. 2). In some aspects, the identical features may indicate presence of the predetermined type of person i.e., employee of the environment and the virtual model may represent uniforms of the employees of the environment. In some aspects, the virtual model may be provided for display over the user interface 130. The virtual model may be accessed by a user (such as an admin of the environment) via the user interface 130 and may allow the user to gain insights such as level of engagement of employees with customers, employee performance etc. Additionally, the virtual model may be utilized to distinguish between employees and non-employees of the environment while determining average footfall pertaining to the environment, etc.

The effectiveness of generating the virtual model may depend on the quality of the transformation applied on an input image. For example, depending on the orientation of the person wearing a uniform, portions of the uniform may not be visible, may be covered by an object, may be colored differently due to environmental changes (e.g., clothing may appear brighter outside and inside), etc.

Figure 5:
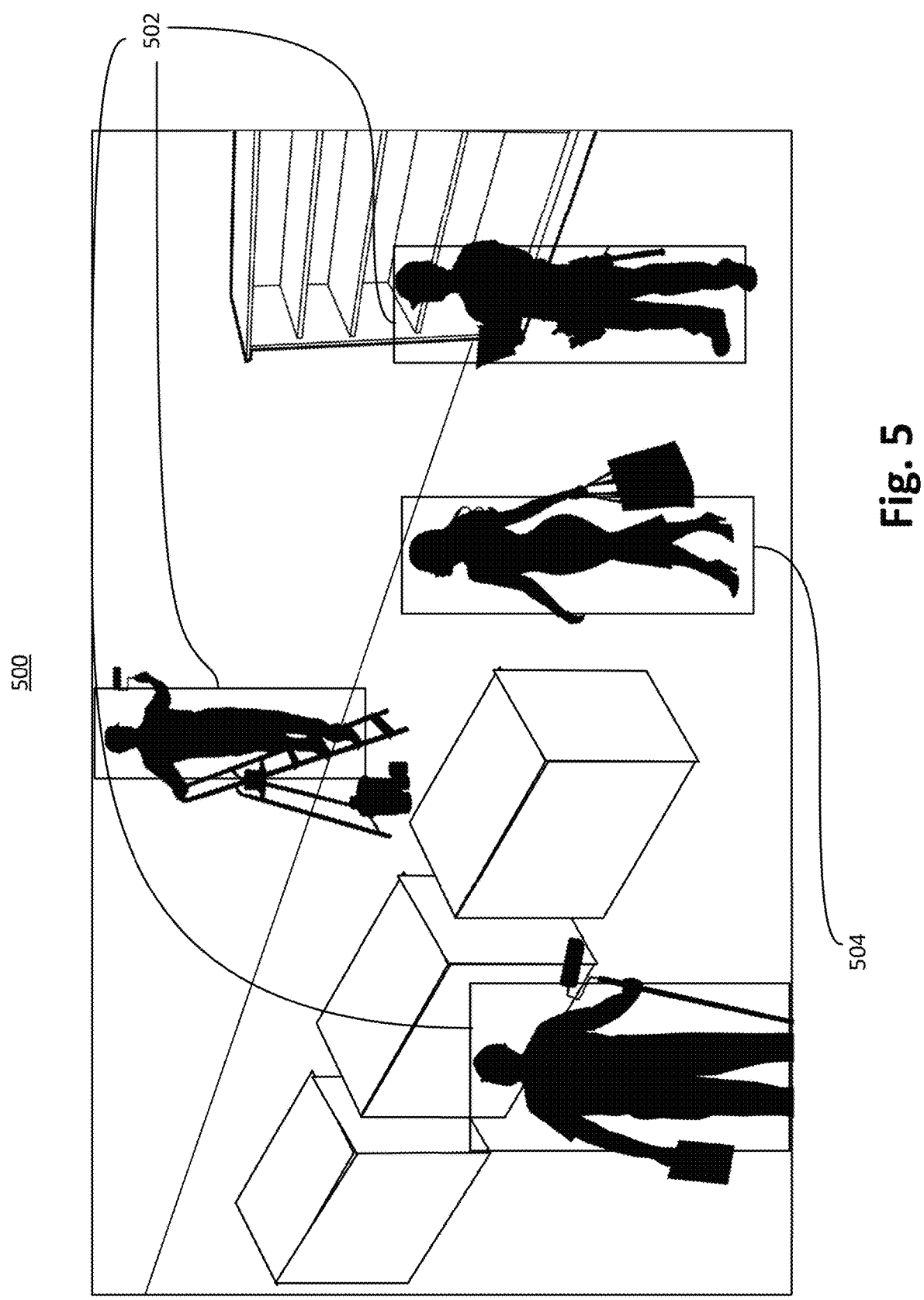
FIG. 5 is a diagram of a data frame depicting various persons in uniforms, in accordance with exemplary aspects of the present disclosure.

FIG. 5 is a diagram 500 of a data frame depicting various persons in uniforms, in accordance with exemplary aspects of the present disclosure. Suppose that the three persons bounded by bounding boxes 502 are employees in a construction zone. Suppose that the person bounded by bounding box 504 is a non-employee. The three persons may share a uniform albeit in different variations. For example, the standard uniform may feature a yellow hard hat and a vest. Some hard hats or vests may feature a logo of a construction company while others may not.

Figure 6:
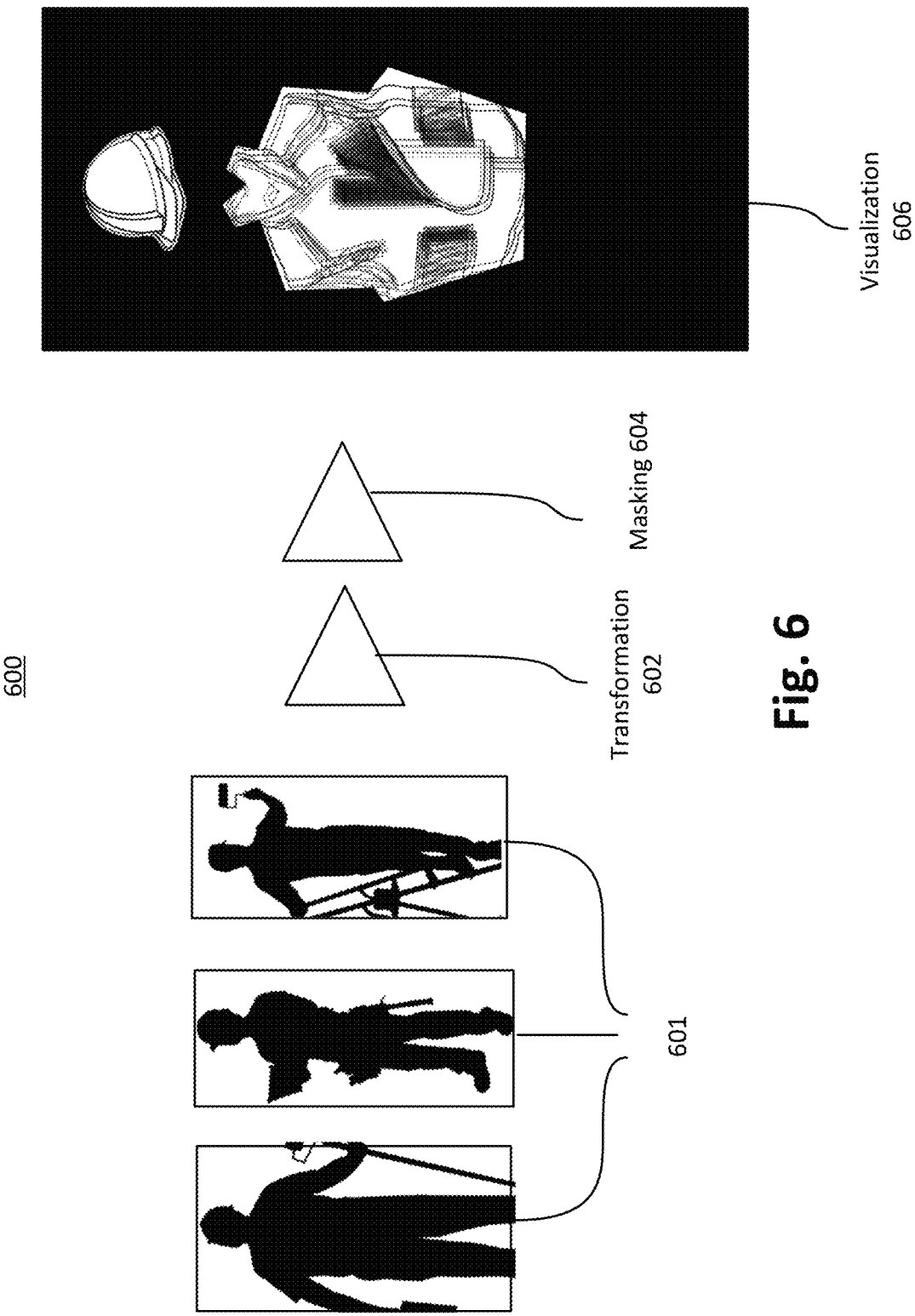
FIG. 6 is a diagram for generating a virtual model of a uniform, in accordance with exemplary aspects of the present disclosure.

FIG. 6 is a diagram 600 for generating a virtual model of a uniform, in accordance with exemplary aspects of the present disclosure. A visualization component (e.g., visualization component 915) may be configured to generating bounding boxes 504 and 502 around detected persons in the frame. In some aspects, visualization component 915 may remove the person in bounding box 504 from consideration when creating a virtual model of the uniform because the person lacks any uniform. Visualization component 915 may verify this by comparing the contents of each of the bounding boxes. While the contents of bounding boxes 502 may show some similarity due to the presence of a uniform, the contents of bounding box 504 may have the greatest contrast from the other images.

In FIG. 6, the bounding box content is shown to pass through transformation 602 (e.g., upsampling, denoising, cropping, stretching, etc.). The transformed contents are then passed through masking 604, which removes PII information from the images. The transformed and masked contents are then overlaid to generate visualization 606. Visualization 606 shows multiple hats and vests, each extracted from the images in bounding box 602. The areas that are black represent portions of the image that are masked or have a high variance in terms of comparison.

FIG. 7 is a diagram 700 for generating a refined virtual model of a uniform, in accordance with exemplary aspects of the present disclosure. In diagram 700, visualization 606 is passed through a classification algorithm 702. The classification algorithm 702 may be a machine learning classifier that receives an input image and outputs a text-based classification of the contents. For example, classification algorithm 702 may provide a written description of visualization 606 (e.g., yellow hard hat, orange vest with a closing flap with hook-and-loop fasteners and two large pockets near the lower rib-section of the vest). In some aspects, the description is highly detailed and indicates the positions of logos, pockets, zippers, etc., in the visualization.

As shown in FIG. 7, the text generated via classification algorithm 702 is passed through image generation model 704, which may be a generative neural network configured to receive text and generate an image corresponding to the text. For example, image generation model 704 may generate visualization 706, which unlike visualization 606, is a cleaner image. The accuracy of visualization 706 may depend on the amount of detail provided in the textual input.

Figure 8:
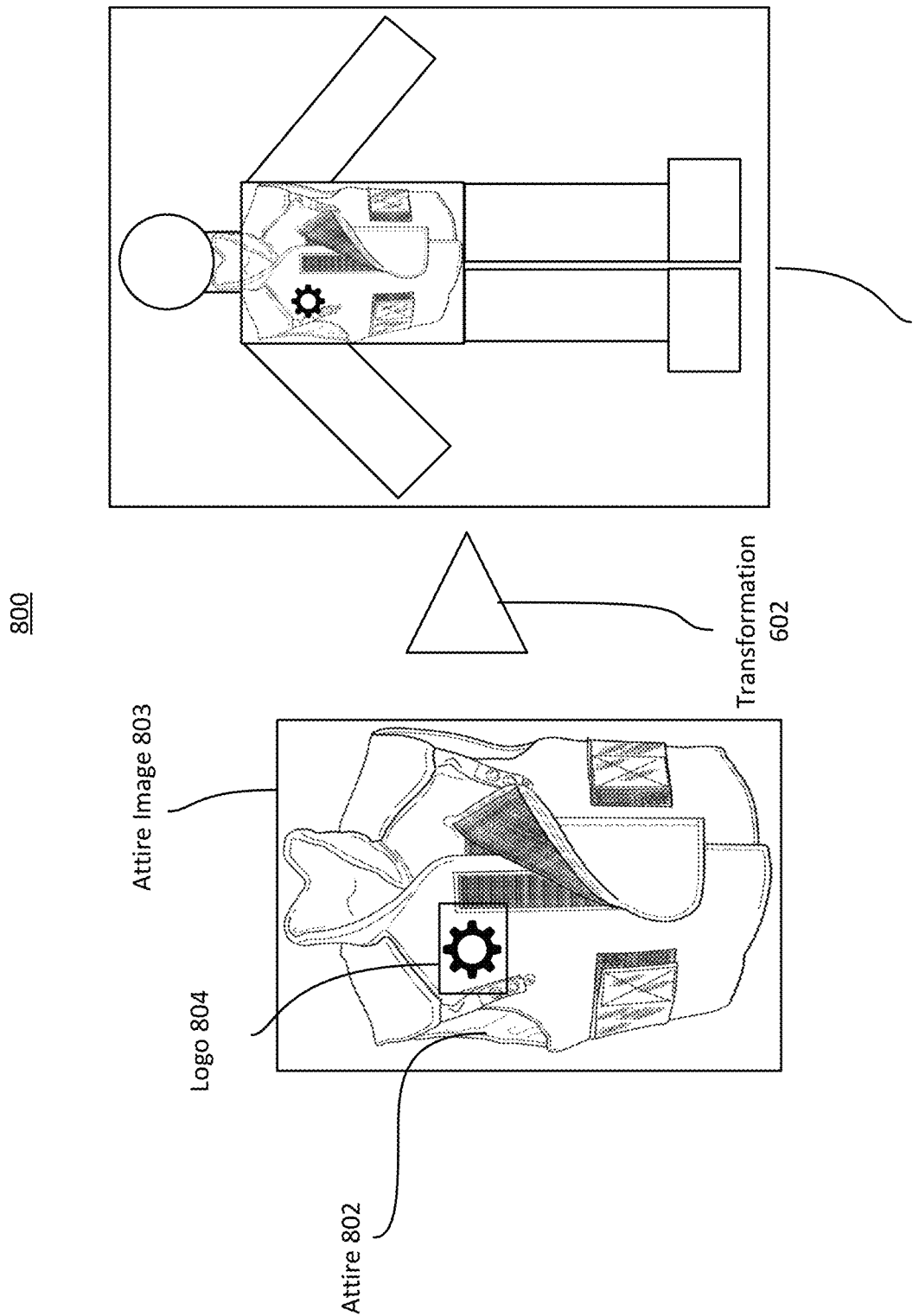
FIG. 8 is a diagram for transforming images to fit a uniform template, in accordance with exemplary aspects of the present disclosure.

FIG. 8 is a diagram 800 for transforming images to fit a uniform template, in accordance with exemplary aspects of the present disclosure. Transformation 602 is an important element because there may be a variety of images that need to be processed. Some images may feature uniforms of varying sizes, from different perspectives, angles, lighting, etc. Transformation 602 fits each of the images into template 806, in order to normalize the images. For example, in FIG. 5, some employees are facing a right edge of the frame and some employees are facing a left edge of the frame. The images in bounding boxes 502 need to be fitted into template 806 in order to prevent the differing orientations from altering visualization 606.

In some aspects, template 806 may be of a given shape. In some aspects, template 806 may have different portions (e.g., head, torso, right arm, left arm, right leg, left leg, right foot, left foot, etc.). Each portion may have a specific shape (e.g., rectangles of varying sizes). Template 806 represents a boundary within which the clothes of a person should fit. A visualization component distorts the contents of bounding box 502 such that the edge of each portion in bounding box 502 reaches the boundary of the template. For example, attire 802 may be enlarged and distorted to fit the torso area of template 806. In some aspects, logo 804 is used as an anchor point such that transformation 602 fits the contents of the bounding box in template 806 without distorting the logo 804.

Figure 9:
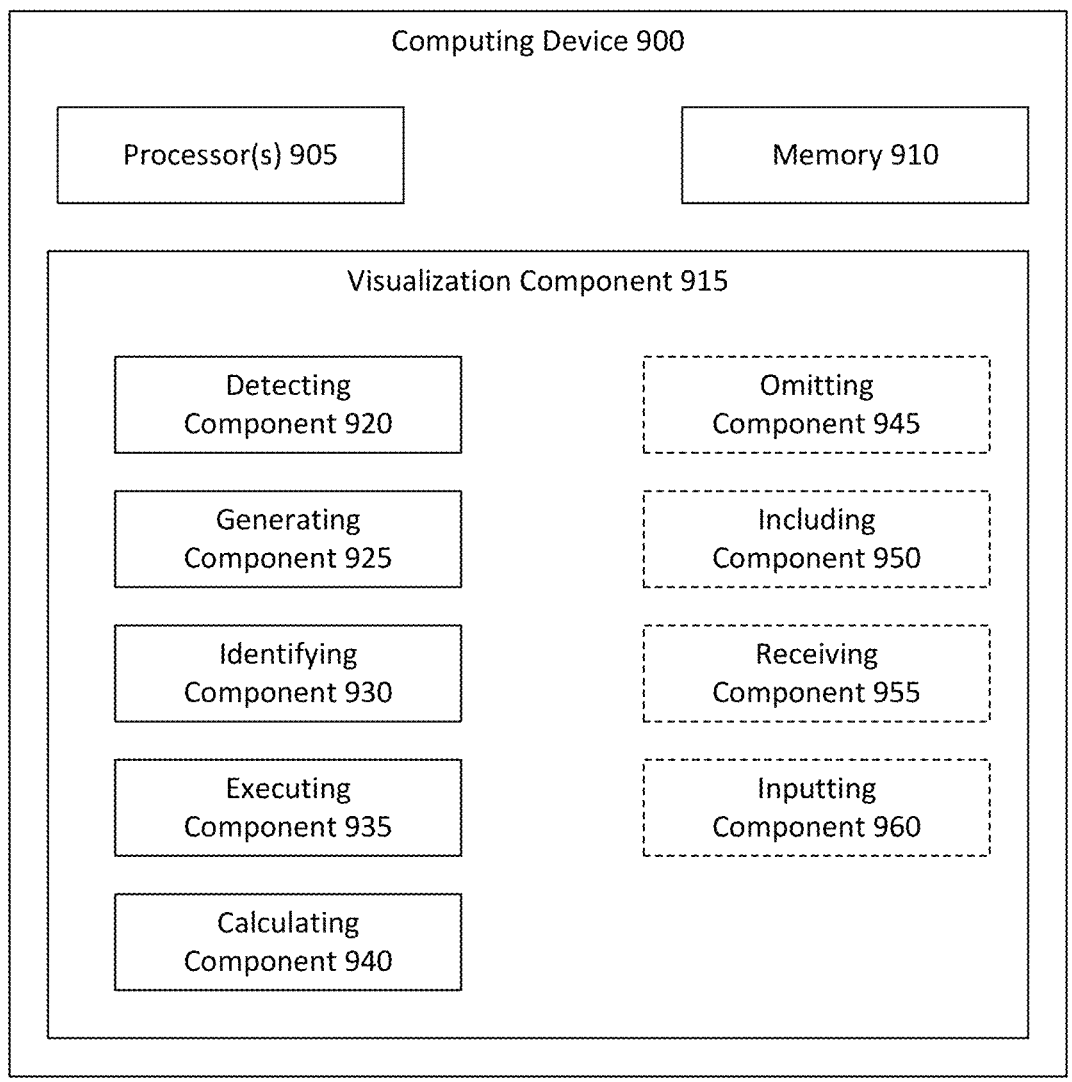
FIG. 9 is a block diagram of an example of a computer device having components configured to perform a method for generating a visual model of a uniform.
Figure 10:
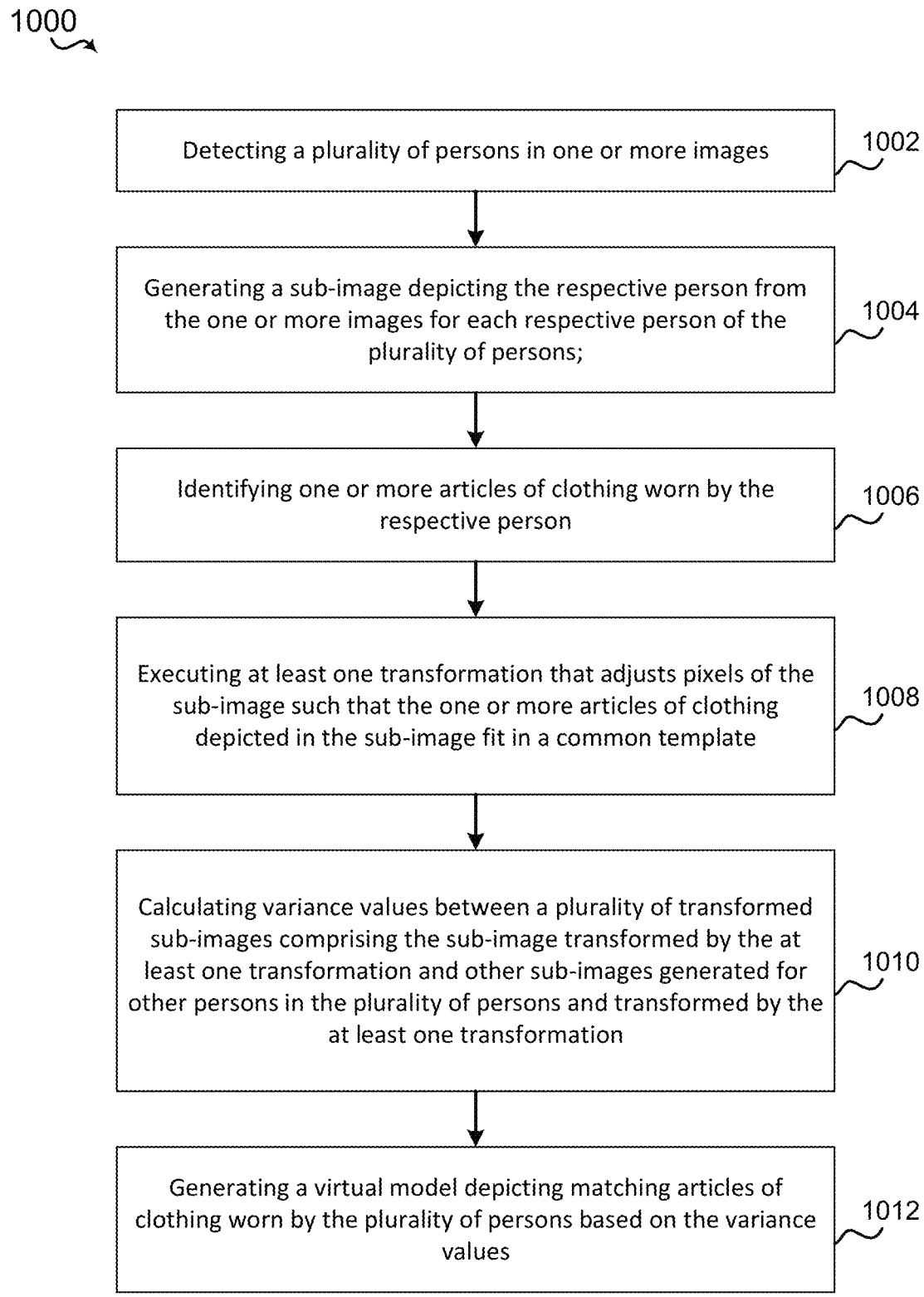
FIG. 10 is a flowchart of an example of a method for generating a visual model of a uniform.

Referring to FIG. 9 and FIG. 10, in operation, computing device 900 may perform a method 1000 for generating a visual model of a uniform, by such as via execution of visualization component 915 by one or more processors 905 and/or one or more memories 910. It should be noted that computing device 900 may correspond to computing device 120. For example, the one or more processors 905 may correspond to processor 206 and the one or more memories 910 may correspond to memory 208. Furthermore, visualization component 915 may perform the functionalities of image data receiver 210, person detector 212 (e.g., via detecting component 920), anonymizer 214 (e.g., via identifying component 930), analyzer 216 (e.g., via calculating component 940), and visualizer 218 (e.g., via generating component 925).

At block 1002, the method 1000 includes detecting a plurality of persons in one or more images. For example, in an aspect, computing device 900, one or more processors 905, one or more memories 910, visualization component 915, and/or detecting component 920 may be configured to or may comprise means for detecting a plurality of persons in one or more images.

For example, visualization component 915 may receive the frame shown in FIG. 5, which depicts one or more employees in a construction zone. Using computer vision and/or machine learning techniques (e.g., object detection), visualization component 915 may detect each of the one or more employees. In some aspects, visualization component 915 may generate a bounding box (e.g., bounding box 502) around each detected employee.

At block 1004, the method 1000 includes generating a sub-image depicting the respective person from the one or more images for each respective person of the plurality of persons. For example, in an aspect, computing device 900, one or more processors 905, one or more memories 910, visualization component 915, and/or generating component 925 may be configured to or may comprise means for generating a sub-image depicting the respective person from the one or more images for each respective person of the plurality of persons.

The sub-image may be a cropped version of the original image. In particular, the dimensions of the cropped version may be limited to the size of the bounding box. For example, a person may be bounded within a bounding box that is 100 pixels long and 40 pixels wide. Accordingly, the sub-image depicts the person and has dimensions of 100 pixels in length and 40 pixels in width. This is shown in FIG. 6, which shows three sub-images taken from the frame shown in FIG. 5.

At block 1006, the method 1000 includes identifying one or more articles of clothing worn by the respective person. For example, in an aspect, computing device 900, one or more processors 905, one or more memories 910, visualization component 915, and/or identifying component 930 may be configured to or may comprise means for identifying one or more articles of clothing worn by the respective person.

For example, for each sub-image, visualization component 915 may execute a machine learning classifier trained to detected articles of clothing (e.g., hats, shirts, vests, pants, etc.).

At block 1008, the method 1000 includes executing at least one transformation that adjusts pixels of the sub-image such that the one or more articles of clothing depicted in the sub-image fit in a common template. For example, in an aspect, computing device 900, one or more processors 905, one or more memories 910, visualization component 915, and/or executing component 935 may be configured to or may comprise means for executing at least one transformation that adjusts pixels of the sub-image such that the one or more articles of clothing depicted in the sub-image fit in a common template. In an alternative or additional aspect, the at least one transformation is one or more of: resizing, rescaling, relocating, upsampling, downsampling, or masking.

For example, visualization component 915 may detect attire image 803 depicting attire 802 in a sub-image. Attire 802 features a vest. Visualization component 915 may apply transformation 602 to attire image 803 such that the attire 802 fits a common template. Suppose that the common template is the torso portion of template 806. Visualization component 915 may stretch or tilt certain sections of attire image 803. Visualization component 915 may also rotate attire image 803 such that attire 802 fits the common template.

In some aspects, visualization component 915 may detect an edge of attire 802 using computer vision techniques (e.g., edge detection). Visualization component 915 may then resize attire image 803 such that at least one point on the detected edge hits each side of common template. Therefore, if the common template has four sides (e.g., is a rectangle), at least one point on the edge of the attire 802 will intersect with a side of the common template. In particular, transformation 602 prevents attire 802 from crossing beyond the boundary of the common template.

In an alternative or additional aspect, the common template is a template boundary of a given shape and size, and the pixels of the sub-image are adjusted such that a sub-image boundary of the one or more articles of clothing in the sub-image matches the template boundary of the common template.

The common template is used as an approach to normalize the varying sizes, angles, perspectives, lighting, etc., that are part of images capturing the detected persons. For example, if one employee wears a medium shirt and another employee wears an extra small shirt, by resizing both shirts to fit the same template, the size disparity does not influence the variance calculation between the two shirts. Similarly, transformation 602 may adjust the color saturation, brightness, hue, etc., of an image. This prevents differing lighting (e.g., a first image being captured in the day and another image being captured at night) from influencing the variance calculation.

At block 1010, the method 1000 includes calculating variance values between a plurality of transformed sub-images comprising the sub-image transformed by the at least one transformation and other sub-images generated for other persons in the plurality of persons and transformed by the at least one transformation. For example, in an aspect, computing device 900, one or more processors 905, one or more memories 910, visualization component 915, and/or calculating component 940 may be configured to or may comprise means for calculating variance values between a plurality of transformed sub-images comprising the sub-image transformed by the at least one transformation and other sub-images generated for other persons in the plurality of persons and transformed by the at least one transformation.

For example, for each sub-image 601 shown in FIG. 6, visualization component 915 may generate a transformed sub-image in the shape of template 806 that includes transformed articles of clothing. The variance values may be a collection of pixel differences between each of the transformed sub-images. For example, the first pixel at position (1,1) of a first transformed sub-image may be compared to the corresponding pixel at position (1,1) of a second transformed sub-image. If the pixel values are the same, the variance value is zero. However, if the pixel values are different, the variance value is one-zero.

At block 1012, the method 1000 includes generating a virtual model depicting matching articles of clothing worn by the plurality of persons based on the variance values. For example, in an aspect, computing device 900, one or more processors 905, one or more memories 910, visualization component 915, and/or generating component 940 may be configured to or may comprise means for generating a virtual model depicting matching articles of clothing worn by the plurality of persons based on the variance values.

For example, visualization component 915 may identify all variance values that are equal to zero and include the corresponding pixels in the virtual model. This is because those pixels are shared by the multiple transformed sub-images and likely represent a part of a uniform. Likewise, all pixels with variance values within a threshold variance value are included in the virtual model. For all other variance values, the pixels are not included in the virtual model. The result may appear like visualization 606, which depicts a uniform. Because all other parts of visualization 606 are different by a large margin, they are filled by a black space.

Subsequent to generating the virtual model, visualization component 915 may use the model to classify persons wearing the uniform (e.g., employees) and persons not wearing the uniform (e.g., customers). For example, a new frame may be received that depicts an employee in a given environment. Subsequent to detecting the person, their attire may be compared to the virtual model. In response to determining that a similarity value (e.g., cosine similarity) is greater than a threshold similarity value between the attire and the virtual model, the person wearing the attire may be classified as an employee. The usage of the virtual model can then help with features such as security. For example, if a person is detected in an environment past its closing time and the person does not have an attire that matches the virtual model, visualization model 915 may trigger a security event (e.g., message a security guard, ring a bell, call the police, etc.).

Referring to FIG. 11, in an alternative or additional aspect, at block 1102, the method 1000 may further include omitting from the virtual model clothing in a region of a given sub-image with a respective variance value greater than a threshold variance value. For example, in an aspect, computing device 900, one or more processors 905, one or more memories 910, visualization component 915, and/or omitting component 945 may be configured to or may comprise means for omitting from the virtual model clothing in a region of a given sub-image with a respective variance value greater than a threshold variance value.

For example, the variance value may be 1.5 and the threshold variance value may be 1.2. Accordingly, the pixels associated with the variance value 1.5 may be omitted from the virtual model (e.g., characterized as black space in visualization 606).

In this optional aspect, at block 1104, the method 1000 may further include including in the virtual model the clothing in the region of the given sub-image with the respective variance value not greater than the threshold variance value. For example, in an aspect, computing device 900, one or more processors 905, one or more memories 910, visualization component 915, and/or including component 950 may be configured to or may comprise means for including in the virtual model the clothing in the region of the given sub-image with the respective variance value not greater than the threshold variance value.

For example, the variance value may be 0.5 and the threshold variance value may be 1.2. Accordingly, the corresponding pixels (likely part of the uniform) are included in the virtual model (e.g., visualization 606). It should be noted that a higher threshold variance value will result in more articles of clothing or parts of clothing being visible in visualization 606.

Referring to FIG. 12, in an alternative or additional aspect, at block 1202, the calculating at block 1010 of the variance values comprises overlaying the sub-image with each of the other sub-images.

For example, each transformed sub-image may be of the same size (e.g., 100 pixels by 50 pixels). When calculating the variance values, the transformed sub-images may be converted into matrices, where each value in a matrix corresponds to a pixel value. For example, M1 may be a first matrix, M2 may be a second matrix, M3 may be a third matrix, etc. The value M1[0,0] corresponds to M2[0,0] and M3[0,0] in the sense that if that they are the same pixel position.

In this optional aspect, at block 1206, the calculating at block 1010 of the variance values comprises determining an average difference in for each overlaid pixel value based on the difference between the sub-image and each of the other sub-images, wherein the variance values are a plurality of average differences.

For example, for each pixel position, the differences between each respective matrix value may be determined and averaged. If M1[0,0]=80, M2[0,0]=75, and M3[0,0]=77.5, the differences are 80-75=5, 80-77.5=2.5, and 77.5-75=2.5 (where the absolute values are taken). The average of these value is given by (5+2.5+2.5)/3=3.33, which is the variance value for position [0,0].

Figure 13:
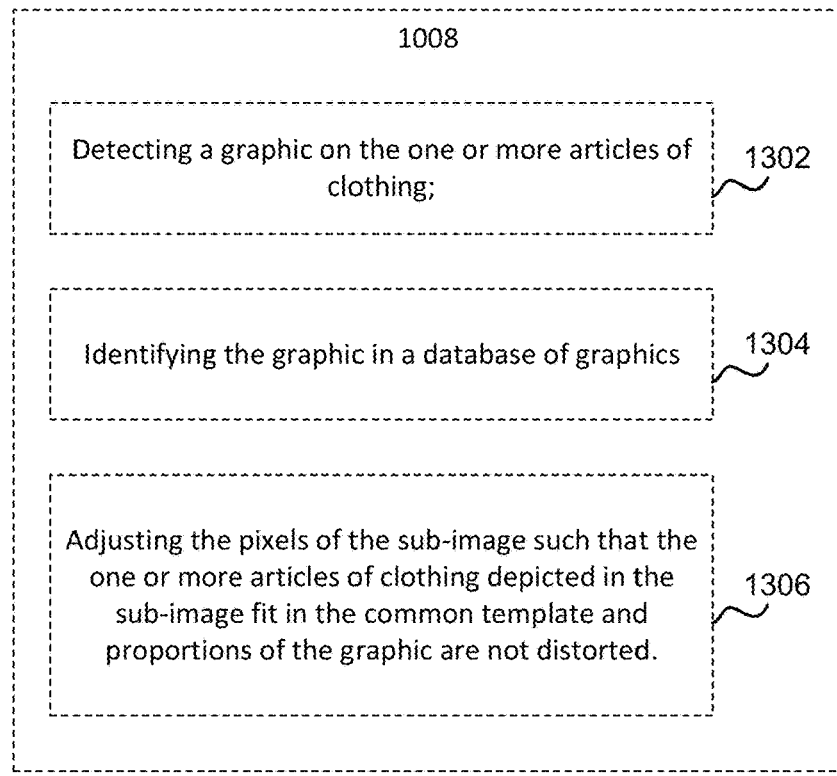
FIG. 13 is a flowchart of additional aspects of the method of FIG. 10.

Referring to FIG. 13, in an alternative or additional aspect, at block 1302, the executing at block 1008 of the at least one transformation comprises detecting a graphic on the one or more articles of clothing.

For example, the graphic may be a logo, a design, a pattern, etc., and may be detected using an object detection algorithm.

In this optional aspect, at block 1306, the executing at block 1008 of the at least one transformation comprises adjusting the pixels of the sub-image such that the one or more articles of clothing depicted in the sub-image fit in the common template and proportions of the graphic are not distorted.

Suppose that the graphic is a logo of a company and is present on all uniforms. The desired virtual model should have the logo because it is the same for all uniforms. If transformation 602 distorts the logo, the variance values associated with the pixels making up the logo will be higher than a threshold variance value. This would result in the logo not appearing properly in the virtual model. Accordingly, transformation 602 may adjust the pixels in the sub-image, but is programmed to not distort the graphic. As a result, the transformations are anchored by the graphic and also do not cause portions of the attire to become disproportionate (e.g., a collar of a shirt being larger than its waist opening).

Figure 14:
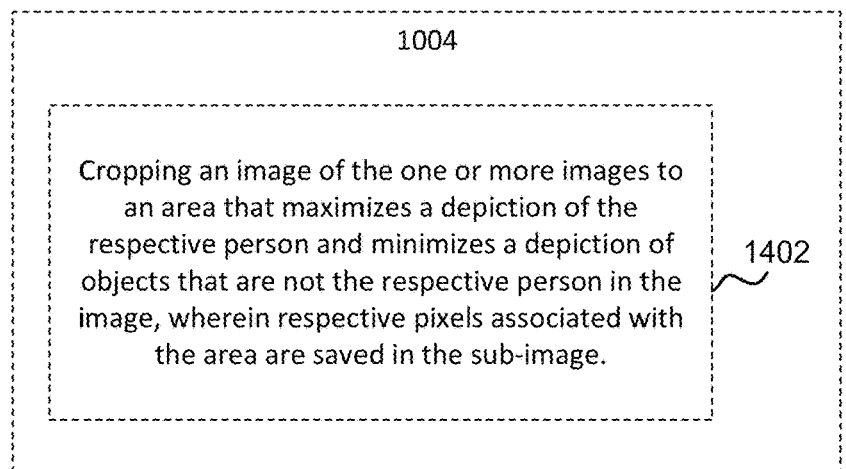
FIG. 14 is a flowchart of additional aspects of the method of FIG. 10.

Referring to FIG. 14, in an alternative or additional aspect, at block 1402, the generating at block 1004 of the sub-image depicting the respective person comprises cropping an image of the one or more images to an area that maximizes a depiction of the respective person and minimizes a depiction of objects that are not the respective person in the image, wherein respective pixels associated with the area are saved in the sub-image. In another example, the bounding box 502 is sized such that the person captured in the bounding box fills the bounding box without crossing the boundaries of the bounding box.

Referring to FIG. 15, in an alternative or additional aspect, at block 1502, the method 1000 may further include receiving a text-based classification describing the virtual model. For example, in an aspect, computing device 900, one or more processors 905, one or more memories 910, visualization component 915, and/or receiving component 955 may be configured to or may comprise means for receiving a text-based classification describing the virtual model.

For example, visualization component 915 may receive a description of the virtual model (e.g., a yellow hard hat, an orange vest with two horizontal stripes extending between the arm sockets, a logo on the upper right chest, two pockets on the lower rib region, etc.).

In this optional aspect, at block 1504, the method 1000 may further include inputting the text-based classification in a generative machine learning model that generates a visualization of the uniform corresponding to the virtual model. For example, in an aspect, computing device 900, one or more processors 905, one or more memories 910, visualization component 915, and/or inputting component 960 may be configured to or may comprise means for inputting the text-based classification in a generative machine learning model that generates a visualization (e.g., visualization 706) of the uniform corresponding to the virtual model.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for generating a visual model of a uniform, comprising:
 a memory; and
 a processor coupled with the memory and configured to:
  detect a plurality of persons in one or more images;
  generate, for each respective person of the plurality of persons, a sub-image depicting the respective person from the one or more images;
  identify one or more articles of clothing worn by the respective person;
  execute at least one transformation that adjusts pixels of the sub-image such that the one or more articles of clothing depicted in the sub-image fit in a common template;
  calculate variance values between a plurality of transformed sub-images comprising the sub-image transformed by the at least one transformation and other sub-images generated for other persons in the plurality of persons and transformed by the at least one transformation by:
   overlaying the sub-image with each of the other sub-images;
   calculating a difference for each overlaid pixel value between the sub-image and each of the other sub-images; and
   determining an average difference for each overlaid pixel value based on the difference between the sub-image and each of the other sub-images, wherein the variance values are a plurality of average differences; and
  generate a virtual model depicting matching articles of clothing worn by the plurality of persons based on the variance values.

2. The apparatus of claim 1, wherein the processor is further configured to:
 omit from the virtual model clothing in a region of a given sub-image with a respective variance value greater than a threshold variance value; and
 include in the virtual model the clothing in the region of the given sub-image with the respective variance value not greater than the threshold variance value.

3. The apparatus of claim 1, wherein the average difference is a weighted average difference.

4. The apparatus of claim 1, wherein the at least one transformation is one or more of: resizing, rescaling, relocating, upsampling, downsampling, or masking.

5. The apparatus of claim 1, wherein to execute the at least one transformation comprises to:
   detect a graphic on the one or more articles of clothing;
   identify the graphic in a database of graphics; and
   adjust the pixels of the sub-image such that the one or more articles of clothing depicted in the sub-image fit in the common template and proportions of the graphic are not distorted.

6. The apparatus of claim 1, wherein the common template is a template boundary of a given shape and size, and wherein the pixels of the sub-image are adjusted such that a sub-image boundary of the one or more articles of clothing in the sub-image matches the template boundary of the common template.

7. The apparatus of claim 1, wherein to generate the sub-image depicting the respective person comprises to:
   crop an image of the one or more images to an area that maximizes a depiction of the respective person and minimizes a depiction of objects that are not the respective person in the image, wherein respective pixels associated with the area are saved in the sub-image.

8. The apparatus of claim 1, wherein the processor is further configured to:
   receive a text-based classification describing the virtual model; and
   input the text-based classification in a generative machine learning model that generates a visualization of the uniform corresponding to the virtual model.

9. The apparatus of claim 1, wherein the plurality of persons have a common uniform.

10. A method for generating a visual model of a uniform, comprising:
    detecting a plurality of persons in one or more images;
    generating, for each respective person of the plurality of persons, a sub-image depicting the respective person from the one or more images;
    identifying one or more articles of clothing worn by the respective person;
    executing at least one transformation that adjusts pixels of the sub-image such that the one or more articles of clothing depicted in the sub-image fit in a common template;
    calculating variance values between a plurality of transformed sub-images comprising the sub-image transformed by the at least one transformation and other sub-images generated for other persons in the plurality of persons and transformed by the at least one transformation by:
       overlaying the sub-image with each of the other sub-images;
       calculating a difference for each overlaid pixel value between the sub-image and each of the other sub-images; and
       determining an average difference for each overlaid pixel value based on the difference between the sub-image and each of the other sub-images, wherein the variance values are a plurality of average differences; and
    generating a virtual model depicting matching articles of clothing worn by the plurality of persons based on the variance values.

11. The method of claim 10, further comprising:
    omitting from the virtual model clothing in a region of a given sub-image with a respective variance value greater than a threshold variance value; and
    including in the virtual model the clothing in the region of the given sub-image with the respective variance value not greater than the threshold variance value.

12. The method of claim 10, wherein the average difference is a weighted average difference.

13. The method of claim 10, wherein the at least one transformation is one or more of: resizing, rescaling, relocating, upsampling, downsampling, or masking.

14. The method of claim 10, wherein executing the at least one transformation comprises:
    detecting a graphic on the one or more articles of clothing;
    identifying the graphic in a database of graphics; and
    adjusting the pixels of the sub-image such that the one or more articles of clothing depicted in the sub-image fit in the common template and proportions of the graphic are not distorted.

15. The method of claim 10, wherein the common template is a template boundary of a given shape and size, and wherein the pixels of the sub-image are adjusted such that a sub-image boundary of the one or more articles of clothing in the sub-image matches the template boundary of the common template.

16. The method of claim 10, wherein generating the sub-image depicting the respective person comprises:
    cropping an image of the one or more images to an area that maximizes a depiction of the respective person and minimizes a depiction of objects that are not the respective person in the image, wherein respective pixels associated with the area are saved in the sub-image.

17. The method of claim 10, further comprising:
    receiving a text-based classification describing the virtual model; and
    inputting the text-based classification in a generative machine learning model that generates a visualization of the uniform corresponding to the virtual model.

18. The method of claim 10, wherein the plurality of persons have a common uniform.

\* \* \* \* \*